Sept. 4, 1951           G. B. SAYRE           2,566,857
AUTOMATIC CONTROL FOR TRANSFER MOLDING PRESSES
Filed May 14, 1947           3 Sheets-Sheet 1
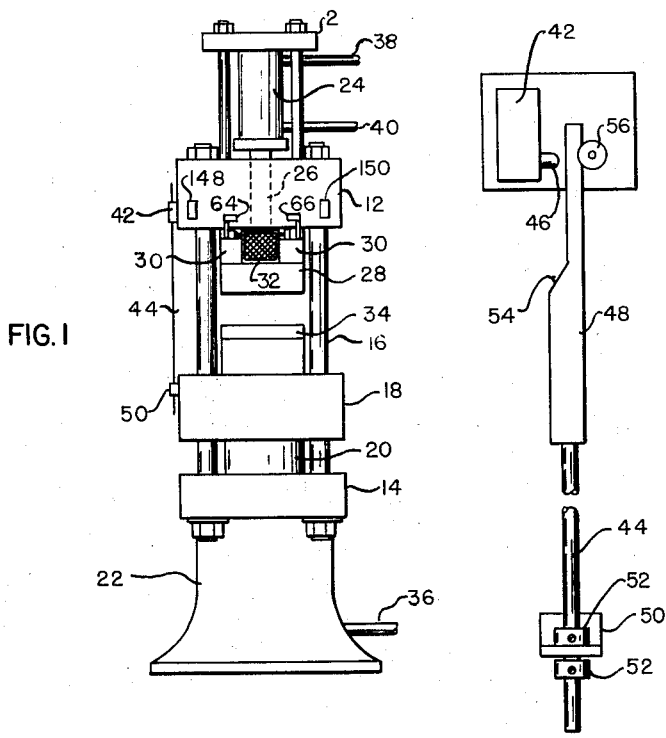
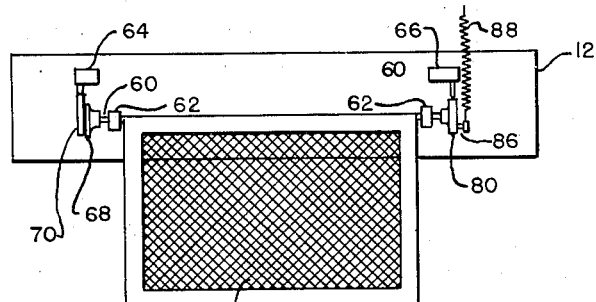
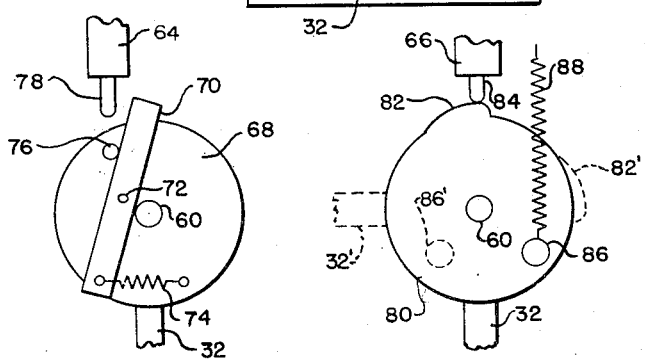
INVENTOR
GORDON B. SAYRE
BY *James and Franklin*
ATTORNEY

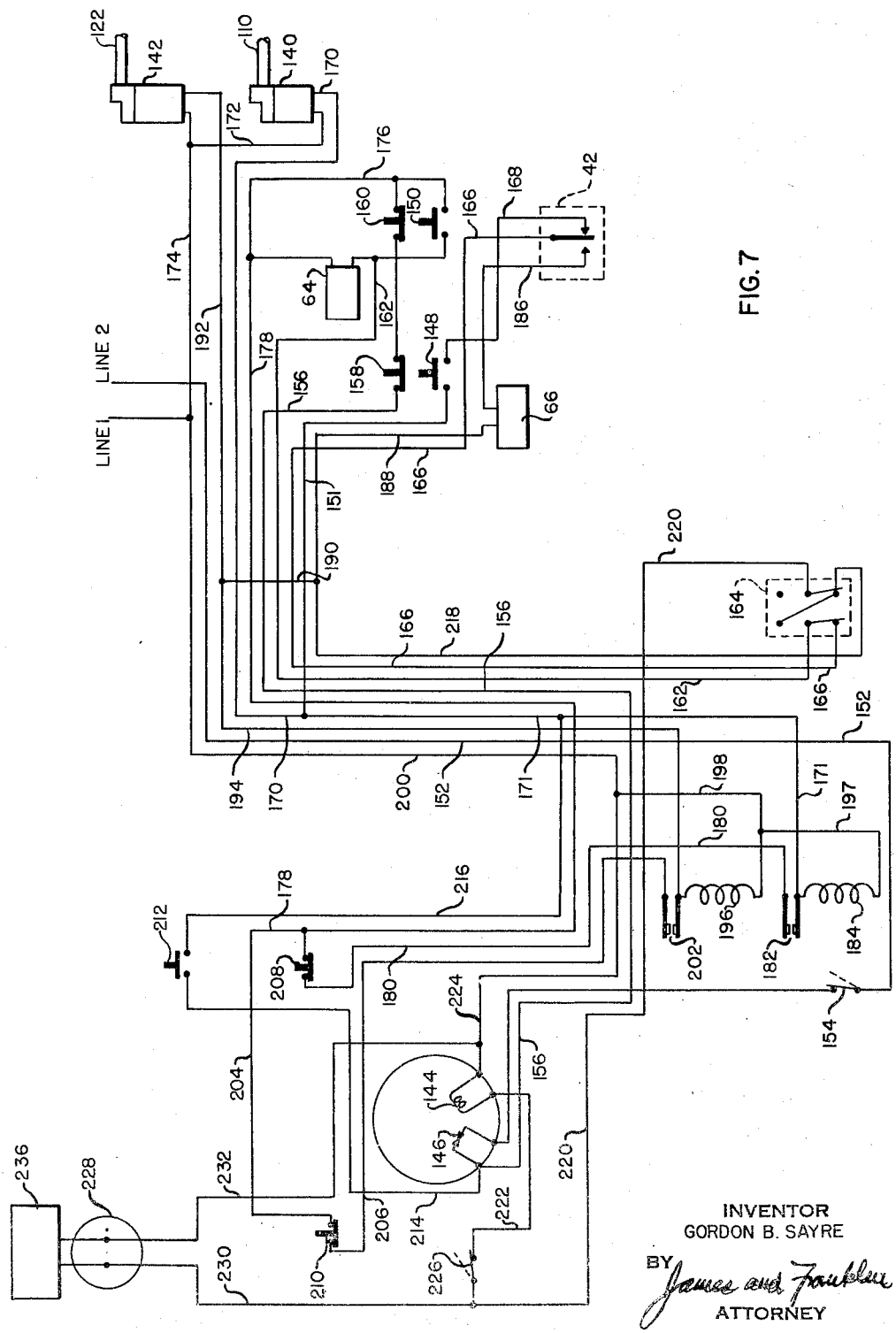

Patented Sept. 4, 1951

2,566,857

UNITED STATES PATENT OFFICE 2,566,857

AUTOMATIC CONTROL FOR TRANSFER MOLDING PRESSES

Gordon B. Sayre, Boonton, N. J., assignor to Boonton Molding Company, Boonton, N. J., a corporation of New Jersey Application May 14, 1947, Serial No. 748,064

22 Claims. (Cl. 18—30)

This invention relates to molding presses, especially for transfer molding of thermosetting resins, and more particularly to automatic control of the same.

A typical transfer molding press is arranged with the main cylinder and ram at the bottom, and the transfer cylinder and plunger at the top of the press. The main ram acts as a clamp to close the die. The transfer plunger transfers or extrudes the molding material from a suitable transfer pot to the die cavities.

Heretofore presses of the specified character have for the most part been controlled manually. To facilitate control of the numerous valves required, certain simplified and partly automatic valves have been developed. However, the control is essentially manual in the sense that an operator must initiate the operation of the valves and must observe a time clock to time the operation of the press, or in some cases, may more crudely estimate the time.

Automatic control systems have also been applied to transfer presses of the type here considered, but so far as I am aware, these have all been of the cycle shaft or program type, that is, they usually have a main cycle shaft which is slowly rotated under motor drive at a predetermined speed, the said shaft turning one complete revolution for one program or molding cycle. The shaft is provided with cams and switches, etc., to suitably control the valves and the press.

The primary object of the present invention is to provide fully automatic control of a transfer molding press, without necessitating the use of a conventional cycle shaft of the program type. The resulting system of my invention is far simpler than the program type, and may be made for only a fraction of the cost.

Ancillary objects are to provide for certain contingencies such as opening the press at any time, permitting the press to remain closed for heating the mold and the transfer plunger before beginning work or during the lunch hour; controlling the press for a major operation, such as taking out one mold and replacing it with another; and lowering the transfer plunger even with the mold open if it be desired to clean the end of the plunger with an air hose. Another ancillary object is to provide for safety of the operator, by the use of a safety gate near the transfer pot, and by the use of a pair of starting buttons spaced widely at opposite sides of the machine, which buttons must be simultaneously pressed by both the right and left hands of the operator in order to start the press.

To accomplish the foregoing general objects, and other more specific objects which will hereinafter appear, my invention resides in the automatic press control elements and their relation one to the other, as are hereinafter more particularly described in the following specification. The specification is accompanied by drawings, in which:

Fig. 1 is an elevation of a typical transfer molding press to which the invention has been applied;

Fig. 2 is an enlarged view of a cam-operated switch used on the press of Fig. 1;

Fig. 3 is an enlarged view of a safety gate used on the press of Fig. 1;

Fig. 4 is an end elevation of switch mechanism at one end of the safety gate of Fig. 3;

Fig. 5 is an end elevation showing cam and switch mechanism at the opposite end of the gate of Fig. 3;

Fig. 7 is a wiring diagram for the electrical part of the apparatus.

Figure 6:
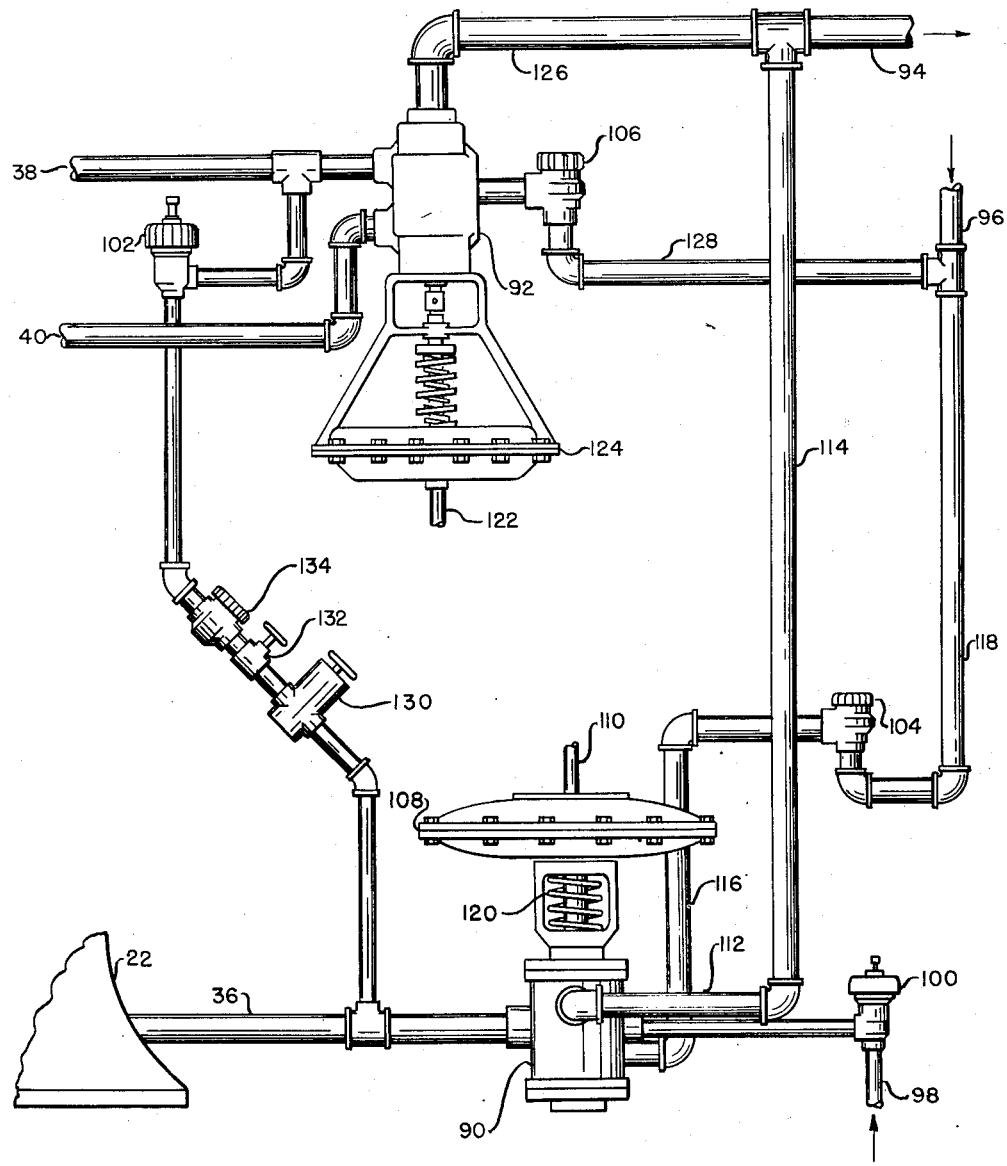
Fig. 6 is a schematic diagram of the valve arrangement used with the present invention.

Referring to Fig. 1, spaced left-hand and right-hand starting buttons 148 and 150 must be simultaneously pushed in order to start closing of the press. Opening and closing of a safety gate 32, corresponding to loading of material in the press, initiates the transfer operation, and also initiates the operation of a timing clock, not shown in Fig. 1, but shown at 144 in Fig. 7. When the timing clock runs out, the press is opened and prepared for the next molding cycle.

Reverting to Fig. 1, a switch 42 ensures that the transfer operation will not be initiated if the mold has not been closed. The safety gate 32 preferably controls two switches 64 and 66, better shown in Figs. 3, 4, and 5. The switch 66 is a safety switch, which is in safe position when the gate is closed, and in unsafe position when the gate is partially or wholly open. The switch 54 is the one which actually starts the transfer operation, and the mechanism between the gate and the switch is such that the switch is not affected during opening of the gate, but is affected during closing of the gate. Thus after the mold is closed, the gate must actually be both opened and closed, for the transfer operation to proceed.

The valve arrangement shown in Fig. 6 is simplified by the use of automatic high valves 100 and 102, so that only low pressure water need be controlled by the main valves 90 and 92.

These valves are commercially made by and may be purchased from Seely Instrument Company, Inc., of Niagara Falls, New York, or Sinclair Collins Company of Akron, Ohio, and perhaps others. The automatic high valve 102 for the transfer cylinder is preferably connected to the clamp cylinder, instead of being connected directly to the high pressure source. This prevents the application of high pressure to the transfer plunger, unless the die is being held closed by high pressure. By means of a pressure regulating valve 130 the high pressure applied to the transfer cylinder may be reduced relative to that applied to the clamp cylinder.

Considering the invention in greater detail, it is here shown applied to a transfer press comprising stationary heads 12 and 14 spaced apart by tie rods 16 which act as a guide for a movable platen 18. The platen 18 is moved by a ram 20 sliding in a cylinder 22 which acts also as a base for the press. The stationary head is surmounted by a transfer cylinder 24 the piston of which drives a transfer plunger 26. The plunger cooperates with a transfer pot formed in an upper die 28 which is carried by head 12. The die is spaced below the head by appropriate spacers or blocks 30. The transfer pot is loaded through the space between blocks 30 (while the transfer plunger 26 is raised), the said loading space being protected by the safety gate 32 previously referred to. The lower die 34 is mounted on the movable platen 18.

The main cylinder 22 is single-acting, it requiring only a single pipe connection 36, while the transfer cylinder 24 is double-acting, it having upper and lower pipe connections 38 and 40.

In accordance with the present invention, the operation of the transfer plunger cannot take place until after closing of the mold, it being self-evident that the mold should be closed before material is forced into the same. This is accomplished by means of the electrical switch 42 previously mentioned, the said switch being operated on closing of the press, by means of a rod 44 extending between the stationary head 12 and the movable platen 18.

The arrangement is shown in greater detail in Fig. 2, referring to which it will be seen that switch 42 is a microswitch having an actuating plunger 46. A cam bar 48 is disposed at the upper end of rod 44. The rod is connected to the movable platen by means of a bracket 50 and adjustable collars 52, it being evident that the adjustment must be appropriately changed when dies of different dimension are carried in the press. The cam bar 48 has a cam surface 54 which bears against and depresses the plunger 46 when the die is closed. The cam bar is guided by one or more flanged rollers 56.

The safety gate 32 is shown in greater detail in Fig. 3. Referring to that figure, it will be seen that the gate is carried on a spindle or trunnions 60 rotatably received in bearings 62 secured to the stationary head 12. Switches 64 and 66 are also mounted on head 12, and are arranged to be actuated in response to movement of the gate. For reasons which will appear later, it is desired that the switch 64 be unchanged when the gate is raised, but actuated when the gate is lowered. The arrangement for this purpose includes a disc 68 and an operating finger 70.

These parts are shown in greater detail in Fig. 4, in which it will be seen that disc 68 carries finger 70 by means of a pivot pin 72. A lightly tensioned pull spring 74 urges the upper end of finger 70 toward the left, as viewed in Fig. 4, its motion being arrested by means of a stop 76. Thus the upper end of finger 70 can move to the right, as shown in Fig. 4, against the tension of spring 74, but not to the left. For this reason it will be evident that when the gate is raised, the finger 70 brushes idly past the plunger 78 of switch 64. However, when the gate 32 is closed, corresponding to clockwise rotation of the disc 68, the finger 70 bears unyieldingly against the plunger 78 and so raises the plunger momentarily as the finger brushes by the plunger.

For reasons which will appear later, it is desired that the other gate switch 66 be kept in one position whenever the gate is closed, and in another position whenever the gate is open. This is accomplished by means of a cam 80, and referring to Fig. 5, it will be seen that cam 80 has a rise 82 bearing against the plunger 84 of the switch 66. At this time the gate is in closed position. Raising of the gate corresponds to a clockwise rotation of the cam 80, thus permitting the plunger 84 to move downward.

The gate is preferably provided with means to normally hold the same in either fully closed or fully open position. For this purpose the cam 80 is provided with a crank pin 86 to which the lower end of a pull string 88 is connected. By inspection of Fig. 5, it will be seen that the crank 86 is well on one side of dead center when the gate 32 is closed. It is moved to a position 86' well on the other side of dead center when the gate is opened to position 32'. Thus the action of spring 88 is to ensure complete opening or complete closing of the gate.

The valve and piping arrangement for the press is schematically illustrated in Fig. 6 of the drawing, and referring to that figure, the pipes 36, 38 and 40 correspond to the similarly numbered pipes shown in Fig. 1, the pipe 36 leading to the lower end of the main cylinder, and the pipes 38 and 40 leading to the upper and lower ends of the transfer cylinder. In general, it may be said that the primary control is by means of electrical circuits and solenoid-operated three-way air valves, not shown in Fig. 6, which in turn cause operation of hydraulic valves operated by compressed air. The hydraulic valves 90 and 92 connect the pipes 36, 38 and 40 to either a source of pressure fluid, usually water, or to a waste line 94. The water connection is in turn connected to both a low pressure source through pipe 96, and a high pressure source through pipe 98, the lower pressure water being used for the main movement, and the high pressure water being used at the end of the movement in order to economize in the use of high pressure water. The admission of high pressure water is preferably controlled by means of so-called "automatic high" valves indicated at 100 and 102. The low pressure lines are fitted with check valves 104 and 106 in order to prevent backing up and loss of high pressure water in the low pressure lines.

The three-way hydraulic valve 90 is operated pneumatically by means of a diaphragm at 108 operated by air supplied through a pipe 110. When the valve 90 is operated, it closes the connection through pipe 112 and pipe 114 to waste pipe 94, and opens the connection through pipe 116, and pipe 118 to low pressure line 96. The low pressure water flows through check valve 104 and valve 90 to pipe 36 and into the cylinder 22. (The spring return 120 of the three-way valve 90 will restore the valve to open the press whenever the pneumatic pressure through pipe 110 is released.)

The low pressure water flows into the cylinder 22 until the mold is closed. For this purpose a comparatively low pressure, say 150 pounds per square inch, is adequate, but the pressure of the low pressure water is usually greater, say 700 pounds per square inch. When the mold is closed, the flow of low pressure water is stopped, and the pressure rises from 150 pounds to 700 pounds. This increased pressure is applied to the automatic high valve 100, and causes the latter to admit high pressure water from pipe 98 to pipe 36 and cylinder 22. The admission of high pressure water also closes the check valve 104. The high pressure is applied to the clamp cylinder 22 and the mold.

When pneumatic pressure is applied through pipe 122 to diaphragm 124 to actuate the four-way hydraulic valve 92, the valve is shifted to connect the pipe 40 to waste (lines 126 and 94), instead of the pipe 38, the latter then being connected to the low pressure line 128, 96. This causes the transfer plunger to move downward. Here again the downward movement of the plunger requires only a fraction of the low pressure, but when the plunger reaches the material to be transferred the pressure builds up to the available pressure (heretofore supposed 700 pounds per square inch). When this occurs, the automatic high valve 102 opens and admits high pressure water to pipe 38. At the same time, the check valve 106 functions to prevent loss of high pressure water in pipe 128.

The high pressure water for the transfer cylinder is preferably supplied through a pressure regulating valve 130, said valve operating to limit how much pressure is available for the transfer operation. There is also an adjustable restriction valve 132 which is used to limit the speed at which the transfer takes place. The piping further includes a check valve 134. This check valve opens upwardly, and functions to prevent flow of low pressure water from the upper cylinder to the lower cylinder when the latter is connected to waste. This happens primarily when the transfer plunger is brought down for cleaning while the mold is open, for at this time the valve 92 will be connected to the low pressure line 96. If the check valve 134 were not provided, water would flow from line 38 of the transfer cylinder to the waste line 94 by way of the three-way hydraulic valve 90, the latter being open to the waste line in order to lower the clamp ram so as to open the mold.

The press is preferably a so-called "80 to 200" press, meaning that the area of the transfer cylinder relative to the area of the clamp cylinder is in the ratio of 80 to 200. The cross-section area of the transfer pot is preferably kept the same in different molds, and the parting face area of the mold cavity is preferably limited so as not to exceed the ratio of 80 to 200 relative to the area of the transfer pot. For this reason there would be no danger of the mold being forced open by the hydrostatic pressure of the molding material even if the full pressure of the high pressure water were applied to the transfer cylinder. However, because of the reducing action of the pressure regulator 130, a lesser pressure is applied to the transfer cylinder, and there is accordingly even less likelihood of the mold being forced open by hydrostatic pressure in the mold cavity. The pressure in the transfer cylinder is not reduced with the object of making it possible to increase the parting face area of the mold cavity, although that might be done. The recommended practice is to limit the parting face area of the mold cavity to the 80 to 200 ratio previously referred to, for another reason, namely, the fact that for best molding results, it has been found that the transfer pot area should not be made too small relative to the mold cavity area, and preferably not smaller than the ratio of 80 to 200 heretofore mentioned.

The electrical part of the apparatus is shown in the wiring diagram of Fig. 7. The pipes 122 and 110 correspond to the air supply pipes 122 and 110 in Fig. 6. The three-way air valve 140 controls the air supply to pipe 110, and the three-way air valve 142 controls the air supply to pipe 122. It will be understood that each of the valves 140 and 142 has two additional pipe connections not shown in the drawing, one to a source of compressed air, and the other for the discharge or waste of used air, and that valve 140 connects pipe 110 to either of the other two pipes, while valve 142 connects pipe 122 to either of the other two pipes. The valves 110 and 122 are electrical, usually solenoid-operated, the solenoids being energized by the circuits shown.

In the wiring diagram, attention is directed to timing clock 144 which controls a pair of normally closed contacts 146. The switch 42 is the press controlled switch shown in Figs. 1 and 2, which indicates that the mold is closed. Switches 64 and 66 in Fig. 7 correspond to the similarly numbered switches in Fig. 3 operated by the safety gate 32. The left-hand and right-hand start buttons are shown at 148 and 150. In practice they are located at opposite sides of the press, as shown in Fig. 1, as a safety measure requiring both hands of the operator to be applied simultaneously to the starting buttons before the press can be closed.

The operation of the circuit is next described, starting with the press in repose position, that is, with the mold open and the transfer plunger raised. Current flows from line 2, and all switching is done in line 2, line 1 being used as a return conductor, which may be grounded. The starting buttons 148 and 150 are pressed. This operates stick relay 184 so that the buttons can be released, and operates air valve 140 to close the press.

Current flows from line 2 through conductor 152 and safe switch 154 to clock contacts 146, and thence through wire 156 to a left-hand stop switch 158, thence to a right-hand stop switch 160, and thence to the right-hand start button 150. Current then flows through wire 162 to a "manual-automatic" switch 164, which is closed downwardly when in the "automatic" position. This switch is an ordinary double-pole, double-throw switch. Current flows from the left center contact to the left lower contact, and thence upwardly through wire 166 to the press switch 42. This is in the right-hand position shown when the press is open, and current flows to the right-hand contact and through wire 168 to the left-hand start button 148, and through conductor 151 to conductor 170, and thence to the solenoid-operated, three-way air valve 140. This causes the press to start closing. The current returns through wire 172 and wire 174, to line 1.

The current flowing through wire 151 to wire 170, also flows downwardly through wire 171 to relay coil 184, to close the relay. The current returns through wire 197, wire 198, and wire 200 to line 1.

Referring back to stop button 160, current flows through wire 176, wire 178, and wire 180, to the contacts 182 of the relay 184, which is now closed. The closing of contacts 182 causes the relay 184 to act as a stick relay and to remain closed, and consequently, the supply of current to the three-way air valve 140 is continued. This supply of current, which keeps relay 184 closed, is fed through the stop buttons 158 and 160, so that pressing of either button will release the relay 184.

When the mold is closed, the press switch 42 is changed from the right-hand to the left-hand position, thus connecting the conductor 166 to the wire 186, which runs to the switch 66 of the safety gate. When the safety gate is raised to load the mold, the switch 66 opens. In Figs. 3 and 5 of the drawing, the gate is closed and the plunger is raised by the cam, thereby closing the switch. After the operator puts the molding material into the transfer pot, he returns the safety gate to its closed or down position. This closes the switch 66, and during the closing of the gate, the finger 70 (Fig. 4) passes the plunger 78 and momentarily raises the plunger and thereby momentarily closes the other gate switch 64. This initiates operation of the transfer plunger.

Reverting to Fig. 7, current flows from the already-established circuit at right-hand stop button 160 and wire 176 through momentarily closed gate switch 64, to wire 162, "manual-automatic" switch 164, wire 166 to press switch 42, through wire 186, gate safety switch 66, now closed, and thence through wire 188 and wire 190, to wire 192 and the magnet of solenoid-operated three-way air valve 142, which controls the transfer cylinder. The current returns through wire 174 to line 1. Thus the opening and closing of the gate after the mold is closed will start the transfer operation. When the gate is opened it remains open until intentionally closed. Meanwhile the mold is loaded.

Current also flows from wire 190 to wire 194, to the coil of relay 196, the said current returning on wire 198 and wire 200, to line 1. Relay 196 closes, thereby closing its contacts 202.

The circuit may be picked up at stop button 160, wire 176, wire 178, to wire 204 and wire 206, to the upper contact 202, and thence through relay coil 196 and wires 198 and 200, back to line 1. Thus the relay acts as a stick relay which remains closed, thereby maintaining current on the magnet of the three-way air valve 142, even though the closing of gate switch 64 was only momentary.

It will be noted that a normally closed push button switch 208 is inserted between conductors 178 and 180, and that a normally closed push button switch 210 is inserted between conductors 204 and 206. The switch 208 is in series with the relay 184, and the switch 210 is in series with the relay 196. This push button 208 may be used to open the stick relay 184, and push button 210 may be used to open the stick relay 196. The operation of these switches and relays is independent of one another. This is to be contrasted with the operation of the left-hand stop button 158, and the right-hand stop button 160, for depression of either of these stop buttons will open both the relays 184 and 196. It is sometimes desirable to open one or the other independently, as when installing a new mold in the press.

There is another push button switch 212, which is normally open. A wire 214 runs from the time clock contacts 146 (carrying current from line 2) to switch 212, and thence by means of a wire 216, to the wire 171. This push button 212 may be used to again actuate the relay 184, after it has been released by use of the push button 208, and the relay, in turn, will energize the three-way air valve 140 for the main ram or so-called clamp cylinder of the press.

So far the air valve 142 has caused the transfer plunger to operate, thereby transferring the molding material from the pot into the mold cavities. At the same time current is also supplied to the motor of the clock 144, in order to start the timing operation. Specifically, current flows from safety gate switch 66 and wire 188, to wire 218, to the lower right-hand terminal of the "manual-automatic" switch 164, and thence upwardly to the center right-hand terminal, to wire 220 and wire 222, to the motor of clock 144. The return is by way of wire 224 and wire 200, to line 1.

It will be noted that the clock starts its timing immediately upon closing of current to the three-way air valve 142 of the transfer cylinder. However, because the time for bringing about the transfer operation itself is substantially the same during successive molding operations, the time clock may be set for a slightly longer interval than the desired actual curing time. Even if such an allowance were not made, the error would not be important, because the time for transfer is very small, and because some curing takes place even during transfer of the material to the mold cavities.

When the time for which the clock is set runs out, the contacts 146 are opened. This interrupts the supply of current from line 2 which, it will be recalled, flowed through conductor 152 and switch 154, to the contacts 146, before going to wire 156, and the stop buttons 158 and 160. The interruption of line 2 current restores the air valves 140 and 142 to initial position, and opens the relays 184 and 196. As the press opens, the press switch 42 changes to "mold open" position. The clock is automatically re-set, and its contacts are again closed, but the closing of the contacts does not re-establish the circuits, because in the meantime the stick relays have been opened, and the circuits are not re-established unless and until the starting buttons 148 and 150 are pressed.

It will be noted that a switch 226 is inserted between wires 220 and 222. This switch 226 may be opened to disconnect the clock during warming-up periods, that is, when it is desired to heat up the mold before beginning operation, as is described later.

If desired a time totalizer 228 may be connected in shunt with the clock motor, by means of wires 230 and 232. The time totalizer may be a simple non-re-setting clock, which operates register wheels reading directly in time. This totalizes the entire time during which the press is actually molding, a factor which is taken into consideration when determining cost figures. Thus, while the timing clock 144 re-sets at the end of each operation of the press, the totalizer 228 integrates the periods of time during which the transfer plunger is down, and thus totals the curing time. A counter 236 is connected in shunt across the totalizer 228, and this counts the number of cycles or press operations, which in turn, if multiplied by the number of die cavities, will count the total number of pieces which have been molded.

An operator often operates two presses. Usually the time clock on only one press is set for the curing time. The time clock on the other press is either disconnected entirely by opening the clock switch 226, or it may be set for its maximum curing time far beyond the actual time wanted. When the first press opens, the operator proceeds to unload the press, to load it with new pre-forms, and to then push the start buttons, thereby starting its molding operation. He then turns to the second press, and presses one of the stop buttons, which releases the press exactly the same as though its time clock had run out. The operator then proceeds to unload the second press, to re-load it, and to push its start buttons. In this way the time clock of the first press is used to time both presses.

When it is desired to clean out the transfer pot, this must be done with the safety gate 32 (Fig. 3) open, and with the mold 34 (Fig. 1) open. In this case the "manual-automatic" switch 164 (Fig. 7) is moved from its downward to its upward position, whereupon the start button 150 may be pressed. Current will then flow through line 162 to the left center contact of switch 164, to the upper left contact, through a diagonal wire on the back of switch 164 running from the upper left to the lower right contact, and thence through wire 218, to wire 190 and wire 192, to the three-way air valve 142 of the transfer cylinder. As long as the start button 150 is held down, the transfer plunger will keep coming down, or remain down. At this time the clock 144 is cut off, and cannot make the transfer plunger rise. An air hose is usually employed, and this may be held in one hand to clean the transfer plunger by use of compressed air, while the plunger is run down by pressing the start button 150 with the other hand. However, on release of the start button, current is removed from three-way air valve 142, and it returns to normal position, thus permitting the transfer plunger to move back.

Another reason for providing for independent operation of the plunger is that the plunger has a suction effect on the cull or residue of molding material left in the die at the bottom of the plunger. Ordinarily the cull is ejected and discarded with the gates and molded pieces, but sometimes the cull may adhere to the plunger, and be pulled upwardly away from the gate. In such case the plunger may be run down by itself, while the mold is open, thus exposing the bottom of the plunger, and making it possible to free the cull from the plunger before resuming the molding operations.

The stick relay 184 is held closed through its contacts 182, and the stick relay 196 is held closed through the contacts 202, and both these relays may be dropped by using either the safety switch 154, or the stop button 158, or the stop button 160. The switch 154 remains open, whereas the buttons work only while being pressed. The relays may be opened individually through the push button switches 208 and 210, the button 208 controlling relay 184, and the button 210 controlling relay 196.

To warm up the press after the shut-down for the week-end, both start buttons 148 and 150 are pressed, thus closing the mold. The safety gate is opened and closed, thereby causing the transfer plunger to come down. At the same time the clock switch 226 is opened, so that the clock will not run, and the press will remain in the closed position, for warming-up, until the press is again opened at the end of the desired warming-up period by pressing a stop button.

It is believed that the structure, electrical circuit, and operation, as well as the advantages of my improved press control, will be apparent from the foregoing detailed description. The press is of rather complex nature, following a somewhat complex molding cycle, yet is controlled by apparatus which does not necessitate a program cycle shaft. The present control apparatus is much simpler, and costs only a fraction of what a regular program cycle shaft control system would cost. Safety for the operator is provided by the use of spaced start buttons, and by means of a safety gate in front of the loading station.

To start operation both left-hand and right-hand starting buttons are pressed simultaneously. The right-hand button supplies current through the press switch to the left-hand button, which feeds the current to the clamp cylinder relay, and to the clamp cylinder valve. Current also flows from the right-hand button to the relay contacts, causing the relay to stick. The next change is when the mold has been closed, at which time the press switch shifts. However, nothing happens until the gate is opened and closed. Closing of the gate sends an impulse of current to the transfer relay, and causes it to stick. At the same time current is supplied to the transfer valve and to the clock, thereby starting the transfer operation, and the measurement of curing time. Nothing further happens until the clock time runs out, at which time the relays are opened; the valves are restored to initial position; the press opens, both as to the mold and the transfer plunger; and the clock re-sets.

There is great flexibility of control for special purposes. For example, either left-hand or right-hand stop button may be used to immediately open the press. However, by changing the "manual-automatic" switch to manual position, a start button may be used to operate the transfer plunger, even with the gate open, for purposes of cleaning the plunger with an air hose. The mold and transfer plunger may be closed for preliminary heating purposes. This preliminary heating is important, and requires considerable time, say three or four hours before beginning operation after a week-end shut-down. The press is thereafter preferably operated three shifts a day, thus being kept hot until the next week-end. During lunch-hour the press and transfer plunger are again kept closed and heated. By keeping the mold closed, radiation from the open inside of the mold is minimized. The transfer plunger usually has no separate source of heat of its own, and is heated by being held in the transfer pot during the heating period.

It will be noted that it is the safety gate that actually starts the transfer operation. It is not necessary to press a start button in addition to closing the safety gate, and mere dropping of the gate starts the transfer operation, and starts the running of the clock, provided, of course, that the mold is closed. Opening or closing of the safety gate will not close the mold, and for that purpose it is necessary to press the left-hand and right-hand start buttons simultaneously, thus ensuring safety for the hands of the operator. Only after the mold has been closed will closing of the safety gate bring about operation of the transfer plunger.

It will be apparent that while I have shown and described my invention in a preferred form, changes may be made, without departing from the spirit of the invention as sought to be defined in the following claims.

I claim:

1. Automatic control mechanism for putting a transfer molding press through a program cycle of operation, said press having a clamp cylinder, a transfer cylinder, a safety gate and a loading station protected by said safety gate, and said control mechanism being devoid of a conventional program cycle shaft or timing shaft with cams thereon, said control mechanism including a valve for the clamp cylinder, a valve for the transfer cylinder, means to start closing of the press, means responsive to the safety gate to start the transfer operation provided the press has theretofore been closed, and a timing clock for timing the curing of the molding material, said timing clock being arranged to so operate the aforesaid valves as to open the press when a predetermined curing time runs out.

2. Automatic control mechanism for putting a transfer molding press through a program cycle of operation, said press having a clamp cylinder, a transfer cylinder, a safety gate and a loading station protected by said safety gate, and said control mechanism being devoid of a conventional program cycle shaft or timing shaft with cams thereon, said control mechanism including a valve for the clamp cylinder, a valve for the transfer cylinder, means to start closing of the press, safety means to prevent transfer operation before the press is closed, means responsive to opening and closing of the safety gate to start the transfer operation provided the press has theretofore been closed, and a timing clock for timing the curing of the molding material, said timing clock being arranged to so operate the aforesaid valves as to open the press when a predetermined curing time runs out.

3. Automatic control mechanism for a transfer molding press having a transfer cylinder, and a loading station for manual loading protected by a safety gate, an electrically operated valve for the transfer cylinder, a circuit responsive solely to a sequential combination of opening and closing of the safety gate to start the transfer operation, and a timing clock, said clock controlling the current supply circuit to the valve in order to operate the valve when a predetermined curing time runs out.

4. Automatic control mechanism for a transfer molding press having a transfer cylinder, and a loading station for manual loading protected by a safety gate, an electrically operated valve for the transfer cylinder, a stick relay for the transfer cylinder valve, a circuit responsive solely to a sequential combination of opening and closing of the safety gate to start the transfer operation, and a timing clock, said clock controlling the current supply circuit to the relay and valve in order to open the relay when a predetermined curing time runs out.

5. Automatic control mechanism for a transfer molding press having a clamp cylinder, a loading station for manual loading of pills of thermosetting molding material, and a transfer cylinder, an electrically operated valve for the clamp cylinder, an electrically operated valve for the transfer cylinder, a stick relay for the clamp cylinder valve, a stick relay for the transfer cylinder valve, a start button to start closing of the press and to close the relays, a circuit dependent on closing of the press to start the transfer operation, and a timing clock, said clock controlling the current supply circuit to the relays and valves in order to open the press and the relays when a predetermined time runs out.

6. Automatic control mechanism for a transfer molding press having a clamp cylinder, a transfer cylinder, a safety gate, and a loading station for manual loading protected by said safety gate, an electrically operated valve for the clamp cylinder, an electrically operated valve for the transfer cylinder, a stick relay for the clamp cylinder valve, a stick relay for the transfer cylinder valve, a start button to start closing of the press and to close the relays, a circuit responsive to the safety gate to start the transfer operation, and a timing clock, said clock controlling the current supply circuit to the relays and valves in order to open the press and the relays when a predetermined time runs out.

7. Automatic control mechanism for a transfer molding press having a clamp cylinder, a transfer cylinder, a safety gate, and a loading station protected by said safety gate, an electrically operated valve for the clamp cylinder, an electrically operated valve for the transfer cylinder, a start button to start closing of the press, a circuit responsive to closing of the press and opening and closing of the safety gate to start the transfer operation, and a timing clock, said clock controlling the current supply circuit to the valves in order to open the press when a predetermined curing time runs out.

8. Automatic control mechanism for a transfer molding press having a clamp cylinder, a transfer cylinder, a safety gate, and a loading station protected by said safety gate, an electrically operated valve for the clamp cylinder, an electrically operated valve for the transfer cylinder, a stick relay for the clamp cylinder valve, a stick relay for the transfer cylinder valve, a start button to start closing of the press and to close the relays, a circuit responsive to closing of the press and opening and closing of the safety gate to start the transfer operation, and a timing clock, said clock controlling the current supply circuit to the relays and valves in order to open the press and the relays when a predetermined curing time runs out.

9. A transfer molding press for the transfer molding of single charges of a thermosetting material in a mold carried by the press, said press having a manual loading station for manually loading a charge of molding material into the press, a safety gate at the loading station, a transfer plunger, means to operate the same, means responsive to closing of the safety gate to initiate the transfer operation, and additional means whereby the transfer operation will not be initiated if the mold has not previously been closed.

10. A transfer molding press for the transfer molding of single charges of a thermosetting material in a mold carried by the press, said press having a manual loading station for manually loading a charge of molding material into the press, a safety gate at the loading station, a transfer plunger, means to operate the same, means responsive solely to a sequential combination of opening and closing of the safety gate to initiate the transfer operation, and additional means whereby the transfer operation will not be initiated if the mold has not been closed previous to the opening and closing of the gate.

11. A transfer molding press having a manual loading station, a safety gate at the loading station, means responsive solely to a sequential combination of opening and closing of the safety gate to initiate the transfer operation, a switch controlled by said safety gate, said switch functioning to start the transfer operation, and operating mechanism for the switch between the safety gate and the switch, said mechanism including a unidirectionally operative element which yields in one direction so that the switch is not affected during opening of the gate, but which engages in the other direction so that the switch is affected during closing of the gate.

12. A molding press having a manual loading station, a safety gate at a loading station, two switches controlled by said safety gate, one of said switches being a safety switch which is in safe position when the gate is closed, and which is in unsafe position when the gate is partially or wholly open, the other of said switches functioning to start the molding operation, and operating mechanism for the latter switch between the safety gate and the switch, said mechanism including a unidirectionally operative element which yields in one direction so that the switch is not affected during opening of the gate, but which engages in the other direction so that the switch is affected during closing of the gate.

13. A transfer molding press having a manual loading station, a safety gate at the loading station, means responsive solely to a sequential combination of opening and closing of the safety gate to initiate the transfer operation, two switches controlled by said safety gate, one of said switches being a safety switch which is in safe position when the gate is closed, and which is in unsafe position when the gate is partially or wholly open, the other of said switches functioning to start the transfer operation, and operating mechanism for the latter switch between the safety gate and the switch, said mechanism including a unidirectionally operative element which yields in one direction so that the switch is not affected during opening of the gate, but which engages in the other direction so that the switch is affected during closing of the gate.

14. A transfer molding press comprising a clamp cylinder controlled by valve means, a transfer cylinder controlled by valve means, a source of low pressure fluid connected to said valve means, a source of high pressure fluid connected through an automatic high pressure valve to the clamp cylinder, and a pipe connection including an automatic high pressure valve between the clamp cylinder and the top side of the transfer cylinder.

15. A transfer molding press comprising a clamp cylinder controlled by a three-way valve, a transfer cylinder controlled by a four-way valve, a source of low pressure fluid connected to said valves, a source of high pressure fluid connected through an automatic high pressure valve to the clamp cylinder, and a pipe connection including an automatic high pressure valve between the clamp cylinder and the top side of the transfer cylinder.

16. A transfer molding press comprising a clamp cylinder controlled by valve means, a transfer cylinder controlled by valve means, a source of low pressure fluid connected to said valve means, a source of high pressure fluid connected through an automatic high pressure valve to the clamp cylinder, a pipe connection including an automatic high pressure valve between the clamp cylinder and the top side of the transfer cylinder, and a pressure-regulating valve in said connection, so that the high pressure applied to the transfer cylinder may be reduced relative to the high pressure applied to the clamp cylinder.

17. A transfer molding press comprising a clamp cylinder controlled by a three-way valve, a transfer cylinder controlled by a four-way valve, a source of low pressure fluid connected to said valves, a source of high pressure fluid connected through an automatic high pressure valve to the clamp cylinder, a pipe connection including an automatic high pressure valve between the clamp cylinder and the top side of the transfer cylinder, and a pressure-regulating valve in said connection, so that the high pressure applied to the transfer cylinder may be reduced relative to the high pressure applied to the clamp cylinder.

18. Automatic control mechanism for a transfer molding press as defined in claim 7, said mechanism having one or more stop switches in the valve circuits, whereby operation of a stop switch opens the press.

19. Automatic control mechanism for a transfer molding press as defined in claim 7, said mechanism having a switch so arranged in said clock circuit as to make the clock inoperative to open the press, whereby the press may be left closed for warming up the same.

20. Automatic control mechanism for a transfer molding press as defined in claim 8, said mechanism having one or more stop switches in the relay circuits, whereby operation of a stop switch opens the press.

21. Automatic control mechanism for a transfer molding press as defined in claim 8, said mechanism having a switch so arranged in said clock circuit as to make the clock inoperative to open the press, whereby the press may be left closed indefinitely for warming up the same.

22. A press having a safety gate, an electric safety switch controlled by said safety gate, and operating mechanism for the switch between the safety gate and the switch, said mechanism including a unidirectionally operative element which yields in one direction so that the switch is not affected during opening of the gate, but which engages in the other direction so that the switch is affected during closing of the gate, whereby the switch is responsive solely to a sequential combination of opening and closing of the safety gate.

GORDON B. SAYRE.

REFERENCES CITED

The following references are of record in the file of this patent:

UNITED STATES PATENTS

| Number | Name | Date |
| --- | --- | --- |
| 1,980,333 | Haessler | Nov. 13, 1934 |
| 2,182,059 | Schwartz | Dec. 5, 1939 |
| 2,187,212 | MacMillin | Jan. 16, 1940 |
| 2,201,244 | Root | May 21, 1940 |